US009652866B2

(12) United States Patent
Chang et al.

(10) Patent No.: US 9,652,866 B2
(45) Date of Patent: May 16, 2017

(54) ELECTRONIC DEVICE AND IMAGE PROCESSING METHOD

(71) Applicant: Wistron Corporation, New Taipei (TW)

(72) Inventors: Yao-Tsung Chang, New Taipei (TW); Chu-Chia Tsai, New Taipei (TW); Ping-Hung Chen, New Taipei (TW); Chih-Yang Hung, New Taipei (TW); I-Chun Wu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/987,795

(22) Filed: Jan. 5, 2016

(65) Prior Publication Data
US 2017/0039730 A1 Feb. 9, 2017

(30) Foreign Application Priority Data

Aug. 4, 2015 (TW) .............................. 104125234 A

(51) Int. Cl.
G06K 9/00 (2006.01)
G06T 7/40 (2017.01)
(Continued)

(52) U.S. Cl.
CPC ............... *G06T 7/408* (2013.01); *G06T 7/20* (2013.01); *H04N 5/232* (2013.01); *G06T 2207/10004* (2013.01)

(58) Field of Classification Search
CPC G06T 3/00; G06T 5/50; G06T 7/0061; G06T 7/0071; G06T 7/20; G06T 7/2006;
(Continued)

(56) References Cited

U.S. PATENT DOCUMENTS 8,233,055 B2 * 7/2012 Matsunaga ............ H04N 5/232
348/222.1
8,248,480 B2 * 8/2012 Matsunaga ............ H04N 5/272
348/208.99
(Continued)

FOREIGN PATENT DOCUMENTS

JP 2009207034 A 9/2009

OTHER PUBLICATIONS

TIPO Office Action dated Apr. 12, 2016 in corresponding Taiwan application (No. 104125234).

Primary Examiner — Jose Couso
(74) Attorney, Agent, or Firm — McClure, Qualey & Rodack, LLP

(57) ABSTRACT

An image processing method is provided. A first image is obtained at a first time point, the first image includes a first object image and a first background image, the first object image corresponds to the position of an object at the first time point. A second image is obtained at a second time point, the second image includes a second object image and a second background image, the second object image corresponds to the position of the object at the second time point, and the first and the second images are shot within substantially the same shooting range. A sum motion vector of the object is obtained according to the first and the second object images. The second object image is kept, and a process is applied to each pixel of the second background image in the second image to generate a third image.

20 Claims, 7 Drawing Sheets

(51) Int. Cl.
*G06T 7/20* (2017.01)
*H04N 5/232* (2006.01)

(58) Field of Classification Search
CPC ..... G06T 7/2073; G06T 7/2086; G06T 7/408;
G06T 15/10; G06T 2207/10004; G06T
2207/20144; G06T 2207/20221; H04N
1/212; H04N 5/144–5/147; H04N 5/2226;
H04N 5/232; H04N 5/23232; H04N
5/23245; H04N 5/23251–5/23254; H04N
5/23261; H04N 5/23267; H04N 5/23287;
H04N 5/235; H04N 5/2356; H04N
5/262–5/2621; H04N 5/2626–5/2628;
H04N 5/272; H04N 5/345; H04N 7/014;
H04N 7/0157; H04N 9/74; H04N
13/0292; H04N 13/0456; H04N 19/139;
H04N 21/8153; G06K 9/00765; G06F
17/30811
See application file for complete search history.

(56) References Cited

U.S. PATENT DOCUMENTS

| | | | |
|---|---|---|---|
| 8,275,212 B2* | 9/2012 | Makii | G06T 5/50 348/229.1 |
| 9,361,703 B2* | 6/2016 | Ohki | H04N 5/23254 |
| 9,432,575 B2* | 8/2016 | Kuchiki | H04N 5/23232 |
| 2006/0007327 A1* | 1/2006 | Nakamura | H04N 5/2621 348/239 |
| 2009/0219415 A1 | 9/2009 | Matsunaga et al. | |
| 2010/0208140 A1* | 8/2010 | Fukunishi | H04N 5/145 348/576 |
| 2016/0269636 A1* | 9/2016 | Kuchiki | H04N 5/232 |
| 2016/0301858 A1* | 10/2016 | Aoyama | H04N 5/23222 |
| 2016/0301872 A1* | 10/2016 | Kameda | H04N 5/23277 |

\* cited by examiner

ELECTRONIC DEVICE AND IMAGE PROCESSING METHOD

This application claims the benefit of Taiwan application Serial No. 104125234, filed Aug. 4, 2015, the subject matter of which is incorporated herein by reference.

BACKGROUND OF THE INVENTION

Field of the Invention

The invention relates in general to an electronic device and an image processing method, and more particularly to an electronic device and an image processing method capable of generating photos carrying sense of speed.

Description of the Related Art

In recent years, due to the advance in technology, more and more electronic devices are equipped with digital camera. The users can take photos with the digital camera of the electronic device whenever and wherever they want to. This is indeed very convenient to the users. However, for an ordinary user, it is not an easy job to take a photo of an object carrying sense of speed. Apart from controlling the shutter, aperture and ISO values of the digital camera, the user still has to control the lens to move along with the moving object. Therefore, how to make an ordinary user capable of taking a photo in which the object carries sense of speed has become a prominent task for the industries.

SUMMARY OF THE INVENTION

The invention is directed to an electronic device and an image processing method capable of generating a photo in which the main body of a moving object is clear and carries sense of speed.

According to one embodiment of the present invention, an image processing method is provided. The image processing method includes following steps. Firstly, a first image is obtained at a first time point, the first image includes a first object image and a first background image, the first object image corresponds to the position of an object at the first time point. Next, a second image is obtained at a second time point, the second image includes a second object image and a second background image, the second object image corresponds to the position of the object at the second time point, the first image and the second image are shot within substantially the same shooting range, and the second image has a plurality of pixels. Then, a sum motion vector of the object is obtained according to the first object image and the second object image. After that, the second object image is kept, and a process is applied to each pixel of the second background image in the second image to generate a third image, wherein one of the pixels of the second background image is used as a particular pixel, and the process applied to the particular pixel includes: obtaining a plurality of related pixels from the plurality of pixels of the second image according to the particular pixel of the second background image and the sum motion vector, and determining the color of the particular pixel according to the obtained related pixels.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
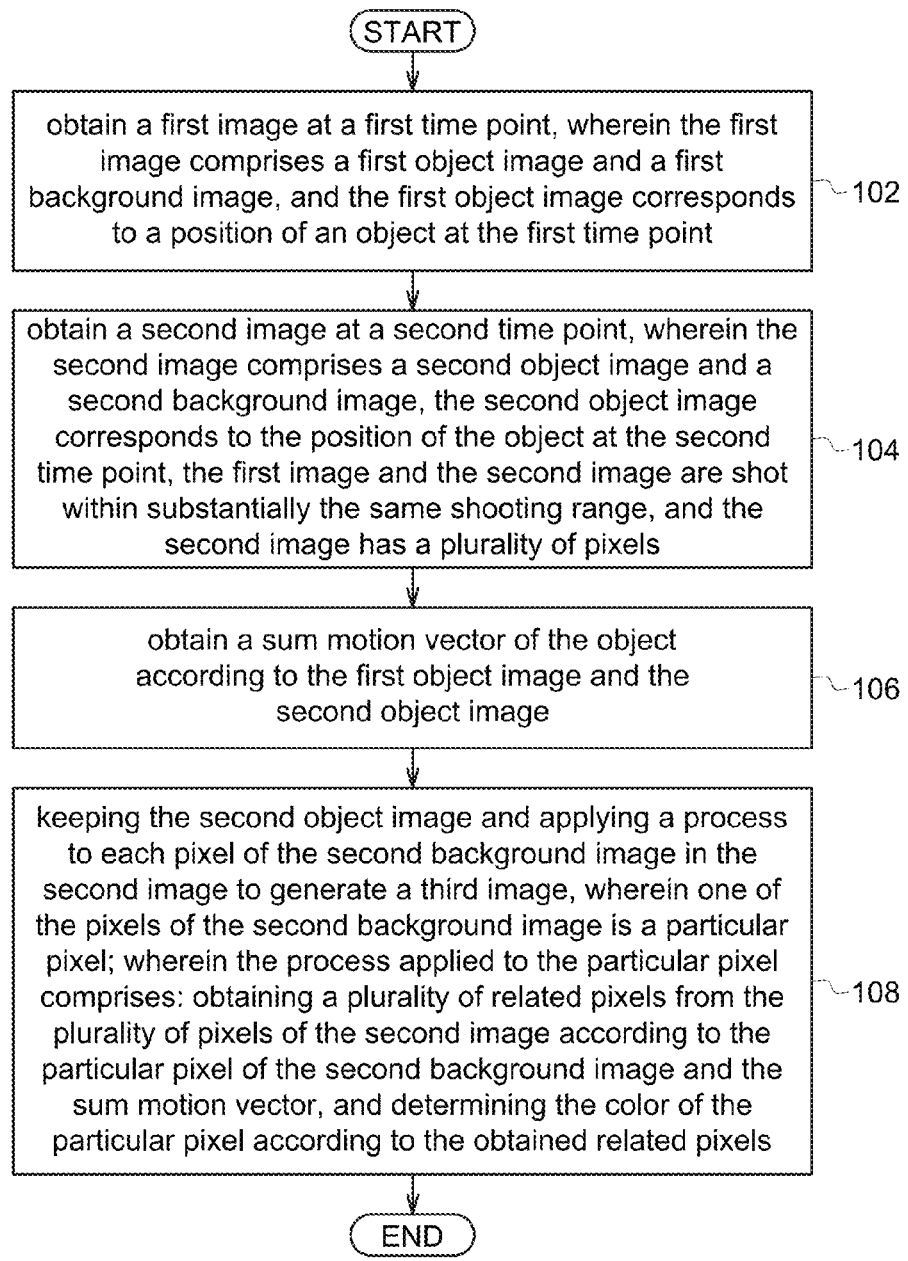
FIG. 1 is a flowchart of an image processing method according to an embodiment of the present invention.

Referring to FIG. 1, a flowchart of an image processing method according to an embodiment of the present invention is shown. The method of the present embodiment includes following steps. Firstly, the method begins at step 102, a first image is obtained at a first time point, the first image includes a first object image and a first background image, the first object image corresponds to the position of an object at the first time point. Next, the method proceeds to step 104, a second image is obtained at a second time point, the second image includes a second object image and a second background image, the second object image corresponds to the position of the object at the second time point, the first image and the second image are shot within substantially the same shooting range, and the second image has a plurality of pixels. Then, the method proceeds to step 106, a sum motion vector of the object is obtained according to the first object image and the second object image. After that, the method proceeds to step 108, the second object image is kept and a process is applied to each pixel of the second background image in the second image to generate a third image, and one of the plurality of pixels of the second background image is used as a particular pixel. The process applied to the particular pixel includes: obtaining a plurality of related pixels from the plurality of pixels of the second image according to the particular pixel of the second background image and the sum motion vector, and determining the color of the particular pixel according to the obtained related pixels.

In the present disclosure, an image is shot within the same shooting range at the first time point and the second time point respectively. In the two photos, the position corresponding to the image of a still scenery is the same but the position corresponding to the image of a moving object is different. Therefore, based on the images shot within the same shooting range at two different time point, the moving direction and displacement of the moving object can be obtained. Then, in the image shot at the second time point, the image corresponding to the moving object is kept, and a blurring process is applied to the image corresponding to the still scenery in a direction reverse to the moving direction of the moving object. Thus, a photograph in which the main body of the moving object has a clear image and carries a sense of speed is obtained.

Detailed descriptions of the steps of FIG. 1 are disclosed below.

Figure 2:
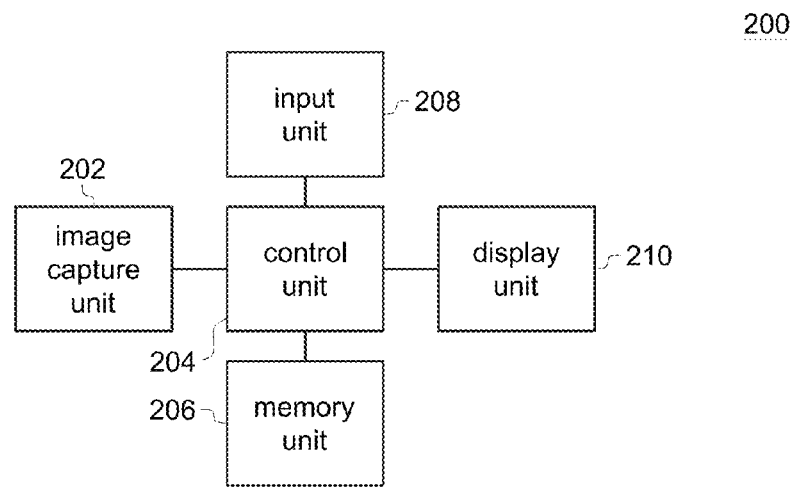
FIG. 2 is a schematic diagram of an electronic device according to an embodiment of the present invention.

Referring to FIG. 2, a schematic diagram of an electronic device according to an embodiment of the present invention is shown. The electronic device 200 includes an image capture unit 202, a control unit 204, a memory unit 206, an input unit 208 and a display unit 210. The control unit 204 is coupled to the image capture unit 202, the memory unit 206, the input unit 208 and the display unit 210. The electronic device 200 can be realized by such as a desktop computer, a notebook computer, a tablet PC, a smart phone or a camera. The image capture unit 202 can be realized by such as a camera lens. The control unit 204 can be realized by such as a processor or a controller. The memory unit 206 can be realized by such as a memory. The input unit 208 can be realized by a component or a device which allows the user to input an instruction, such as a touch panel, a keyboard, a mouse, or a microphone. The display unit 210 can be realized by such as a monitor.

Also, refer to FIG. 1. In step 102, after the user sends a shooting instruction through the input unit 208, the control unit 204 controls the image capture unit 202 to obtain a first image at a first time point, the first image includes a first object image and a first background image. The first object image corresponds to the position of an object at the first time point. The first image has a plurality of pixels.

Figures 3A, 3B:
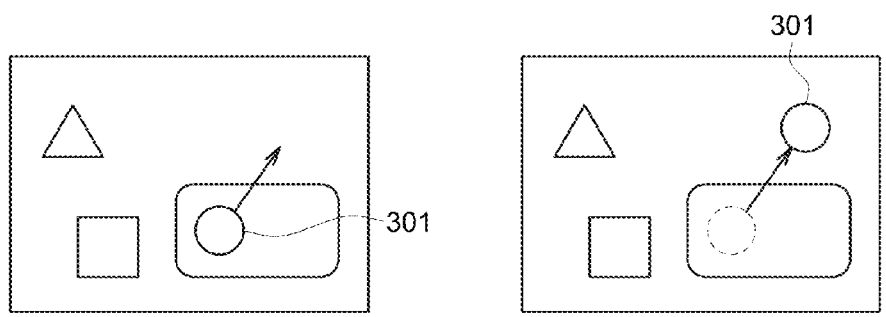
FIGS. 3A-3B are schematic diagrams showing the motion of a moving object.

In step 104, the control unit 204 controls the image capture unit 202 to obtain a second image within substantially the same shooting range at a second time point, the second image includes a second object image and a second background image, the second object image corresponds to the position of the object at the second time point, and the second image has a plurality of pixels. Referring to FIGS. 3A-3B, schematic diagrams showing the motion of a moving object are shown. In FIGS. 3A-3B, the object 301 is a moving object moving along an arrow direction. The portion of the image other than the object 301 is the background image. For example, the triangular object, the squared object and the rounded rectangle are still and are parts of the background image. FIG. 3A shows the position of the object 301 at the first time point. FIG. 3B shows the position of the object 301 at the second time point.

For example, within the shooting range of the image capture unit 202, an object 301 is moving but the background objects are still. As indicated in FIGS. 3A and 3B, within the shooting range of the image capture unit 202, the position of the object 301 at the first time point is different from the position of the object at the second time point, but the positions of the background objects at the first time point are the same as that at the second time point. In steps 102 and 104, the first image is obtained at the first time point, the second image is obtained at the second time point. Thus, the image corresponding to the position of an object in the first image (that is, the first object image) will be different from the image corresponding to the position of the object in the second image (that is, the second object image). Besides, the first image and the second image both are clear images. For example, when the control unit 204 controls the image capture unit 202 to obtain the first image and the second image, clear images can be obtained by suitably adjusting the shutter speed and correspondingly adjusting the aperture and ISO values.

In step 106, the control unit 204 obtains a sum motion vector of an object according to the first object image and the second object image. For example, the control unit 204 subtracts the grayscale value of each pixel of the first image from the grayscale value of corresponding pixel of the second image, the parts of the image at which the grayscale value differences are not equal to 0 or not close to 0 are the position of the first object image in the first image and the position of the second object image in the second image, and are defined as the first position and the second position respectively. The sum motion vector of the object can be obtained according to the distance and direction of the first position and the second position. It should be noted that when the portion of the image at which the grayscale value differences is over a predetermined value can be regarded as the portion of the image at which the grayscale value difference is not close to 0. The predetermined value can be adjusted according to the needs.

In step 108, the control unit 204 keeps the second object image and applies a process to each pixel of the second background image in the second image to generate a third image, wherein one of the plurality of pixels of the second background image is used as a particular pixel. The process applied to the particular pixel includes: obtaining a plurality of related pixels from the plurality of pixels of the second image according to the particular pixel of the second background image and the sum motion vector, and determining the color of the particular pixel according to a plurality of obtained related pixels. That is, the third image includes an object image corresponding to the second object image, and the image generated in the process applied to each pixel of the second background image according to the sum motion vector of the object. For example, the process is applied to each pixel of the second background image in the second image only, not to the pixel of the second object image. In the process, one pixel of the second background image is used as a particular pixel, and a plurality of pixels of the second image are obtained according to the sum motion vector of the object and the particular pixel. The pixels of the second image obtained according to the sum motion vector of the object and particular pixel can be defined as related pixels. Lastly, the color of the particular pixel is determined according to the obtained related pixels to obtain the third image. The memory unit 206 stores the first image, the second image and the third image disclosed in the above steps. The display unit 210 shows the first image, the second image and the third image.

A number of embodiments are exemplified below.

First Exemplary Embodiment

In the present exemplary embodiment, the image capture unit 202 of the electronic device 200 only has a lens.

Figure 4A:
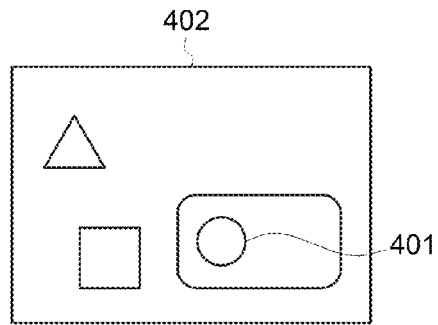
FIGS. 4A-4B are schematic diagrams of a first image and a second image shot by a lens controlled by a control unit at the first time point and the second time point respectively.
Figure 4B:
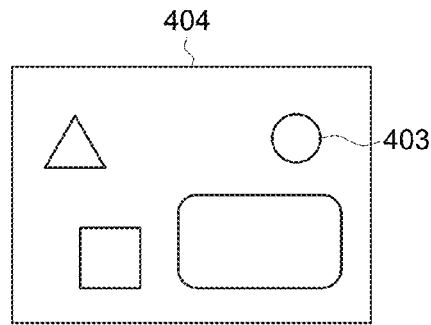

In step 102, the control unit 204 controls the lens to shoot a first image at the first time point. In step 104, the control unit 204 controls the lens to shoot a second image at the second time point. Referring to FIGS. 4A-4B, schematic diagrams of a first image and a second image shot by a lens controlled by a control unit at the first time point and the second time point respectively are shown. Let the motion of the object 301 of FIG. 3 be taken for example. FIG. 4A is a first image 402 shot by the lens controlled by the control unit 204 at the first time point. FIG. 4B is a second image 404 shot by the lens controlled by the control unit 204 at the second time point. The object 301 moves in an arrow direction. As indicated in FIGS. 4A and 4B, the first object image 401 corresponds to the position of an object 301 in the first image 402 at the first time point; the second object image 403 corresponds to the position of the object 301 in the second image 404 at the second time point. Additionally, the portion of the first image 402 other than the first object image 401 is the first background image, and the portion of the second image 404 other than the second object image 403 is the second background image.

Figure 5A:
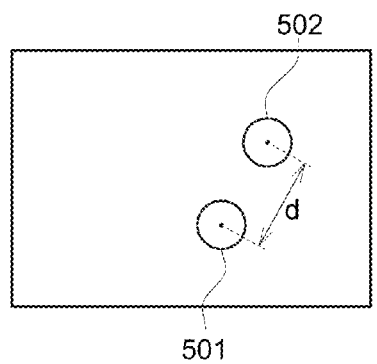
FIGS. 5A-5B are schematic diagrams of sum motion vector obtained by a control unit according to the first object image and the second object image.
Figure 5B:
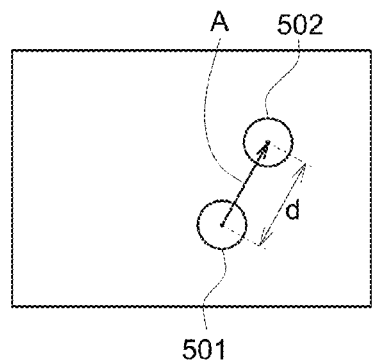

After the first image 402 and the second image 404 are obtained, the method proceeds to step 106. In step 106, the control unit 204 subtracts the first image 402 from the second image 404 to obtain a sum motion vector of the object. Referring to FIGS. 5A-5B, schematic diagrams of a sum motion vector obtained by a control unit 204 according to the first object image 401 and the second object image 403 are shown. FIG. 5A shows the position of the first object image 401 and the position of the second object image 403 obtained by the control unit 204 by subtracting the first image 402 from the second image 404. FIG. 5B shows the moving direction and distance of the object. Furthermore, In step 106, as indicated in FIG. 5A, the control unit 204 subtracts the grayscale value of each pixel of the first image 402 from the grayscale value of corresponding pixel of the second image 404 to obtain a subtracted image. In the subtracted image, the portion of the image at which the grayscale value difference is not equal to 0 or not close to 0 corresponds to the position of the first object image 401 in the first image 402 (that is, the first position 501) and the position of the second object image 403 in the second image 404 (that is, the second position 502). The sum motion vector A of the object can be obtained according to the distance d and direction of the first position 501 and the second position 502.

Figure 6:
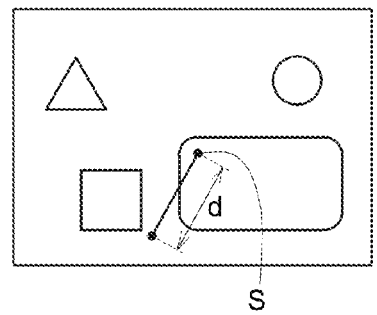
FIG. 6 is a schematic diagram of a process applied to a particular pixel by a control unit.

After the sum motion vector A of the object is obtained, the method proceeds to step 108. In step 108, the control unit 204 keeps the second object image 403 and applies a process to each pixel of the second background image in the second image 404 to generate a third image. Referring to FIG. 6, a schematic diagram of a process applied to a particular pixel S by a control unit 204 is shown. As indicated in FIG. 6, the control unit 204 uses one pixel of the second background image as a particular pixel S. The control unit 204 uses the particular pixel S as the starting point, obtains all pixels within the length of the sum motion vector A in a direction starting from the starting point and along the reverse direction of the sum motion vector A, and further takes average of the colors of all obtained pixels and uses the averaged color as the color of the particular pixel S. Suppose there are 200 pixels within the length of the sum motion vector A in a direction starting from the starting point and along the reverse direction of the sum motion vector A. The colors of the 200 pixels (such as RGB values) are added up and taken averages. Then, the averaged RGB values are used as the RGB values of the particular pixel. The same process is repeated until the process has been applied to each pixel of the second background image.

Figure 7:
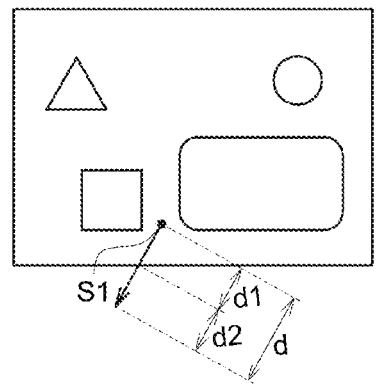
FIG. 7 is a schematic diagram of a process applied to a particular pixel by a control unit according to another exemplary embodiment.

Referring to FIG. 7, a schematic diagram of a process applied to a particular pixel by a control unit 204 according to another exemplary embodiment is shown. As indicated in FIG. 7, when the control unit 204 obtains all pixels within the length of the sum motion vector A in a direction starting from the starting point and along the reverse direction of the sum motion vector A, the control unit 204 obtains all pixels between the starting point and the edge of the second image in a direction starting from the starting point and along the reverse direction of the sum motion vector A if at least portion of the pixels obtained within the length of the sum motion vector A are located outside the edge of the second image.

Figure 8:
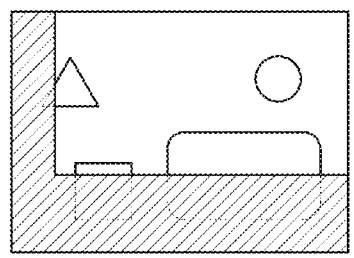
FIG. 8 is a schematic diagram of the particular pixel deleted by a control unit.

For example, the control unit 204 uses one pixel of the second background image as a particular pixel S1. When the control unit 204 uses the particular pixel S1 as the starting point and obtains all pixels within the length of the sum motion vector A in a direction starting from the starting point and along the reverse direction of the sum motion vector A, a portion of the pixels within the length d2 are located outside the edge of the second image. Therefore, the control unit 204 obtains all pixels between the starting point and the edge of the second image in a direction starting from the starting point and along the reverse direction of the sum motion vector A. That is, the control unit 204 obtains all pixels within the length d1 in a direction starting from the starting point and along the reverse direction of the sum motion vector A, and takes average of the colors of all obtained pixels and uses the averaged color as the color of the particular pixel S1. Or, the control unit 204 may delete the particular pixel S1, and skip the step of obtaining the pixels and taking average of the pixels. Referring to FIG. 8, a schematic diagram of a particular pixel deleted by a control unit 204 is shown. The control unit 204 uses each pixel of the second background image as a particular pixel and applies the process to each particular pixel once. Therefore, when the particular pixel is used as the starting point, and all pixels within the length of the sum motion vector A are obtained in a direction starting from the starting point and along the reverse direction of the sum motion vector A, all the pixels of the second background image used as particular pixels will be deleted if at least a portion of the pixels are located outside the edge of the second image. As indicated in FIG. 8, the meshed area represents the deleted portion of the image. Thus, the resolution of the second image will become even smaller.

Figure 13:
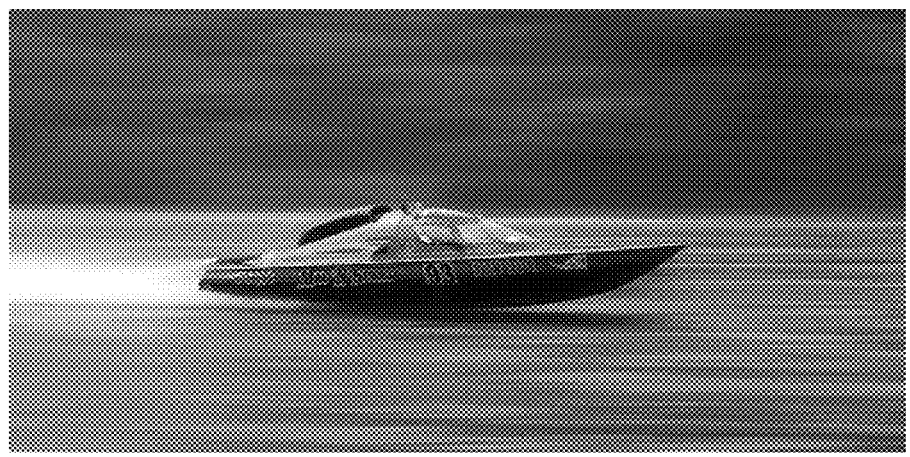
FIG. 13 is an example of a photo carrying sense of speed.

Referring to FIG. 13, an example of a photo carrying sense of speed is shown. The image generated according to the above steps is an image in which the main body of a moving object is clear and carrying sense of speed.

Second Exemplary Embodiment

The second exemplary embodiment is different from the first exemplary embodiment in that the image capture unit 202 of the electronic device 200 is a stereo camera lens having two lenses, namely, a first lens and a second lens. The first lens and the second lens are disposed adjacent to each other. In the process, a plurality of related pixels are obtained from the plurality of pixels of the second image not only according to the particular pixel of the second background image and the sum motion vector, but also according to the depth of field displacement. And the color of the particular pixel is determined according to a plurality of obtained related pixels.

In step 102, the control unit 204 controls the first lens to shoot a first image and controls the second lens to shoot a third image at the first time point. In step 104, the control unit 204 controls the first lens to shoot a second image and controls the second lens to shoot a fourth image at the second time point. That is, the second exemplary embodiment is different from the first exemplary embodiment in that at the first time point, the second exemplary embodiment not only uses a lens to shoot the first image, but also uses another lens to shoot a third image, and at the second time point, the second exemplary embodiment not only uses a lens to shoot the second image, but also uses another lens to shoot a fourth image. The third image includes a third object image and a third background image. The third object image corresponds to the position of an object at the first time point. The fourth image includes a fourth object image and a fourth background image. The fourth object image corresponds to the position of the object at the second time point. The first image, the second image, the third image and the fourth image are shot within substantially the same shooting range.

Figure 9A:
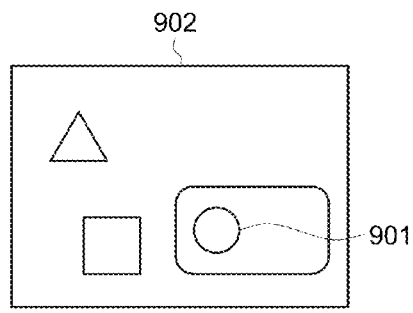
FIGS. 9A-9D are schematic diagrams of a first image and a third image respectively shot by a first lens and a second lens at a first time point, and a second image and a fourth image respectively shot by a first lens and a second lens at the second time point.
Figure 9B:
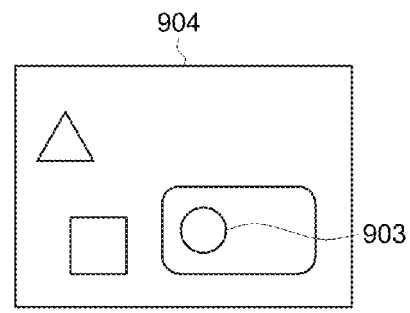
Figure 9C:
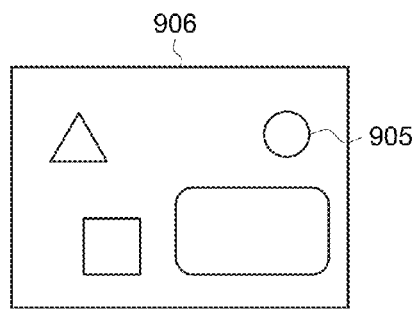
Figure 9D:
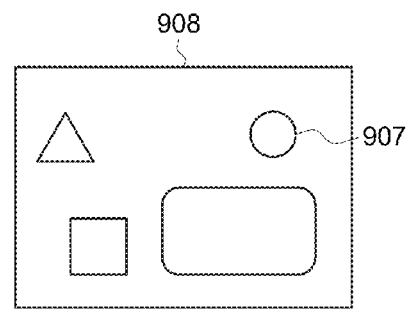

Let the object motion of FIG. 3 be taken for example. Referring to FIG. 9A-9D, schematic diagrams of a first image and a third image respectively shot by a first lens and a second lens at a first time point, and a second image and a fourth image respectively shot by the first lens and the second lens at the second time point are shown. FIG. 9A shows the first image 902, the first image 902 includes a first object image 901, and the portion of the first image 902 other than the first object image 901 is a first background image. FIG. 9B shows the third image 904, the third image 904 includes a third object image 903, and the portion of the third image 904 other than the third object image 903 is a third background image. FIG. 9C shows the second image 906, the third image 904 includes a second object image 905, and the portion of the second image 906 other than the second object image 905 is a second background image. FIG. 9D shows the fourth image 908, the third image 904 includes a fourth object image 907, and the portion of the fourth image 908 other than the fourth object image 907 is a fourth background image.

Since the first image 902 and the third image 904 are shot within substantially the same shooting range at the first time point, the view-angle difference between the first image 902 and the third image 904 will be small. Similarly, since the second image 906 and the fourth image 908 are shot within substantially the same shooting range at the second time point, the view-angle difference between the second image 906 and the fourth image 908 will be small as well. In the present exemplary embodiment, the first image 902 and the second image 906 are shot by the same lens (such as the first lens), and the third image 904 and the fourth image 908 are shot by another lens (such as the second lens).

After the first image 902, the second image 906, the third image 904 and the fourth image 908 are obtained, the method proceeds to step 106. In step 106, the control unit 204 subtracts the first image 902 from the second image 906 or subtracts the third image 904 from the fourth image 908 to obtain a sum motion vector of the object A. The step of subtracting the first image 902 from the second image 906 or subtracting the third image 904 from the fourth image 908 to obtain a sum motion vector of the object A by the control unit 204 is similar to the same step disclosed in the first exemplary embodiment, and the similarities are not repeated here.

Figure 10:
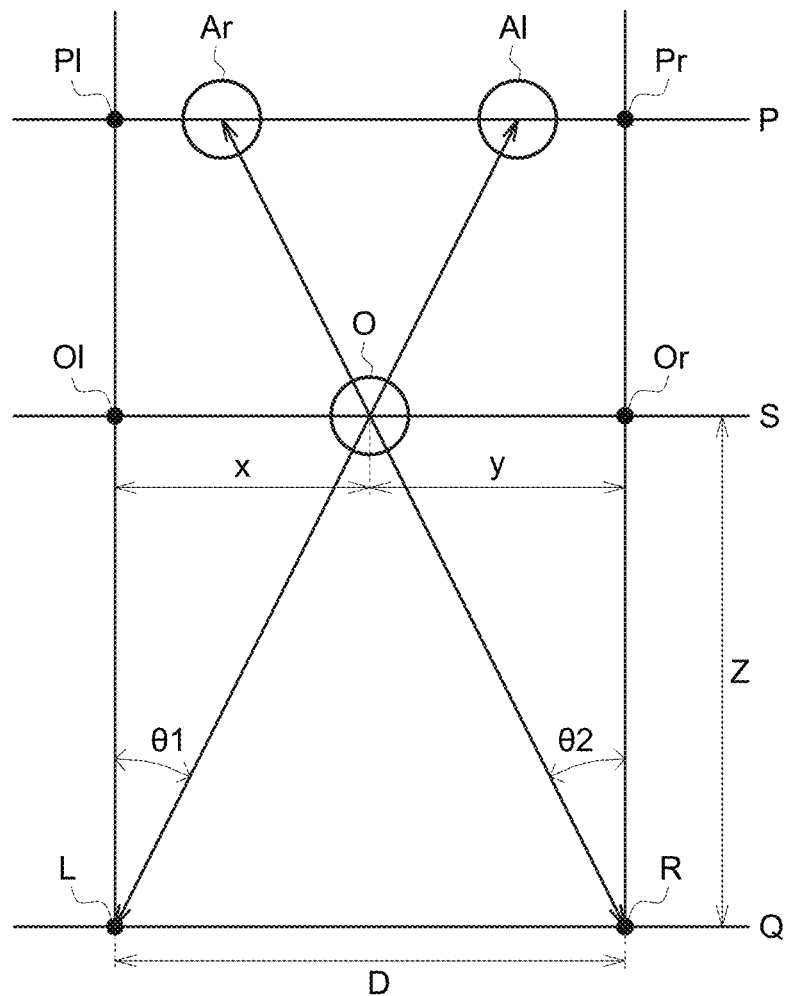
FIG. 10 is a diagram showing the calculation of depth of field according to the view-angle difference.

After the sum motion vector of the object A is obtained, the control unit 204 further calculates a first depth of field of the object 301 at the first time point according to the view-angle difference between the first object image 901 and the third object image 903, calculates a second depth of field of the object 301 at the second time point according to the view-angle difference between the second object image 905 and the fourth object image 907, and obtain a depth of field displacement according to the first depth of field and the second depth of field. In the present exemplary embodiment, the depth of field is the distance between the object and the first lens and the second lens. To be more specifically, the first lens and the second lens are on the same plane which is perpendicular to the ground and can be defined as a lens plane. The first depth of field is the distance between the object 301 and the lens plane at the first time point. The second depth of field is the distance between the object 301 and the lens plane at the second time point The first depth of field can be calculated according to the distance between the first lens and the second lens and the view-angle difference between the first object image 901 and the third object image 903. Referring to FIG. 10, a diagram showing the calculation of depth of field according to the view-angle difference is shown. D represents a distance between the first lens L and the second lens R. O represents an object that is shot (such as the object 301). P represents a photo plane which is perpendicular to the ground. Al represents an image of the object O on the photo shot by the first lens L (such as the first object image 901 of the first image 902). Ar represents an object image of the object O on the photo shot by the second lens R (such as the second object image 905 of the second image 906). Q represents a lens plane which is perpendicular to the ground and parallel to the photo plane P. S represents an object plane which is perpendicular to the ground and parallel to the photo plane P and the lens plane Q. P1 represents an intersection of the photo plane P and a straight line extended from the first lens L and perpendicular to the photo plane P. Pr is represents intersection of the photo plane P and a straight line extended from the second lens R and perpendicular to the photo plane P. θ1 represents an angle formed between the object image A1 and the forward direction of the first lens L, and can be obtained from the distance between the intersection P1 and the object image A1. θ2 represents an angle formed between the object image Ar and the forward direction of the first lens R, and can be obtained from the distance between the intersection Pr and the object image Ar. Z represents a depth of field. O1 represents an intersection of the object plane S and a straight line extended from the first lens L and perpendicular to the object plane S. Or represents an intersection of the object plane S and a straight line extended from the second lens R and perpendicular to the object plane S. X represents a distance between the intersection O1 and the object O. Y represents a distance between the intersection Or and the object O. Given that D=X+Y, Tan(θ1)=X/Z, Tan(θ2)=Y/Z, X can be expressed as: X=Z*Tan(θ1), Y=Z*Tan(θ2). Given that D=X+Y, D can be expressed as: D=Z*Tan(θ1)+Z*Tan(θ2). In the above formulas, the distance D, Tan(θ1) and Tan(θ2) are already known, so that the depth of field Z can be obtained. The depth of field Z is a distance between the object O and the lens plane Q.

According to the said method, the first depth of field of the object 301 at the first time point can be calculated according to the view-angle difference between the first object image 901 and the third object image 903. Besides, the second depth of field of the object 301 at the second time point can be calculated according to the view-angle difference between the second object image 905 and the fourth object image 907. After the first depth of field and the second depth of field are obtained, the control unit 204 obtains the depth of field displacement according to the first depth of field and the second depth of field. Furthermore, the control unit 204 determines the depth of field displacement according to the first depth of field, the second depth of field and a look-up table. Table 1 is a look-up table illustrating the relationship between depth of field of an object and its corresponding position in an image. As indicated in Table 1, the look-up table includes a plurality of depths of field and their corresponding positions in an image. When the first depth of field is 10 meters and the second depth of field is 20 meters, the corresponding position of the first depth of field in the image will be X1, and the corresponding position of the second depth of field in the image will be X2. Then, the control unit 204 can obtain the depth of field displacement by subtracting the corresponding position X1 from the corresponding position X2. Additionally, in an embodiment, if the first depth of field and the second depth of field cannot be found in the look-up table, then the control unit 204 can calculate the corresponding position in the image of the first depth of field and the corresponding position in the image of the second depth of field by interpolation or extrapolation. For example, when the first depth of field is 15 meters and the second depth of field is 42 meters, the control unit 204 can calculate the corresponding position in the image of the depth of field of 15 meters by interpolation according to the depth of field of 10 meters and its corresponding position X1 and the depth of field of 20 meters and its corresponding position X2. Assuming that the corresponding position of the depth of field of 15 meters in the image is X, the corresponding position X can be calculated as:

$$X = \frac{X2 + X1}{2}$$

by interpolation $$\frac{20 - 10}{X2 - X1} = \frac{15 - 10}{X - X1}.$$

Likewise, the control unit 204 can calculate the corresponding position of the depth of field of 42 meters in the image by interpolation according to the depth of field of 40 meters and its corresponding position X4 and the depth of field of 50 meters and its corresponding position X5. Then, the control unit 204 can obtain the depth of field displacement by subtracting the corresponding position in the image of the depth of field of 15 meters from the corresponding position in the image of the depth of field of 42 meters. The depth of field displacement represents the displacement of the object 301 in the image when the object 301 towards the first lens and the second lens or the displacement of the object 301 in the image when the object 301 moves away from the first lens and the second lens. Besides, the look-up table as indicated in Table 1 can be obtained through several times of measurement and can be pre-stored in the memory unit 206 of the electronic device 200. For example, the corresponding position of the object in the image of the depth of field of 10 meters is recorded; the corresponding position of the object in the image of the object which moves away from the camera plane by 10 meters is also recorded. Several groups of data can be pre-recorded in the same manner.

TABLE 1

| Depth Of Field | Corresponding Position in the Image |
| --- | --- |
| 10 meters | X1 |
| 20 meters | X2 |
| 30 meters | X3 |

TABLE 1-continued

| Depth Of Field | Corresponding Position in the Image |
| --- | --- |
| 40 meters | X4 |
| 50 meters | X5 |
| . . . | . . . |

Then, the method proceeds to step 108. In step 108, the control unit 204 keeps the second object image and applies a process to each pixel of the second background image in the second image to generate a third image. One of the plurality of pixels in the second background image is used as a particular pixel. When applying the process to a particular pixel, the control unit further obtains a plurality of related pixels from the plurality of pixels of the second image according to the particular pixel of the second background image, a sum motion vector and a depth of field displacement, and determines the color of the particular pixel according to the obtained related pixels.

Figure 11A:
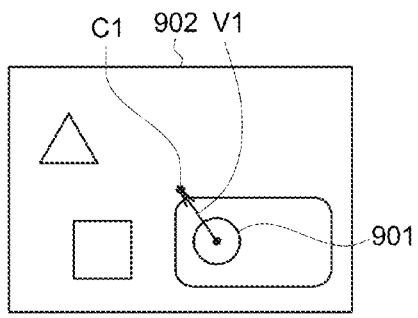
FIGS. 11A-11D are diagrams of obtaining a plurality of related pixels from the plurality of pixels of the second image according to the particular pixel of the second background image, a sum motion vector and a depth of field displacement.

Referring to FIGS. 11A-11D, diagrams of obtaining a plurality of related pixels from the plurality of pixels of the second image according to the particular pixel of the second background image, a sum motion vector and a depth of field displacement are shown. As indicated in FIG. 11A, the control unit 204 determines a first depth of field motion vector V1 according to a depth of field displacement, a direction of first object image 901 heading towards the horizon center C1 of the first image 902. Furthermore, the control unit 204 determines the direction of the first depth of field motion vector V1 according to the direction of first object image 901 heading towards the horizon center C1 of the first image 902, and determines the length of the first depth of field motion vector V1 according to the depth of field displacement. The horizon center can be determined from two images shot by two lenses within substantially the same shooting range. Referring to FIGS. 9A and 9B. The grayscale value of each pixel of the first image 902 is compared with the grayscale value of corresponding pixel of the third image 904, and a plurality of pixels whose grayscale value differences with the grayscale values of corresponding pixels of the third image 904 are equal to 0 or close to 0 are found out from all pixels of the first image 902. These found out pixels form one or more image regions in the first image 902. Then, an image region is selected from the one or more image regions, and anyone horizontal line within the first image 902 passes through the selected image region. The center of the horizontal line is defined as a horizon center. Assuming that the object moves in a direction away from the first lens and the second lens. When the object is getting farther and farther away from the first lens and the second lens, the position of the object in the image captured by the first lens and the second lens will be closer to the horizon center. Thus, in the present exemplary embodiment, the direction of the object image towards the horizon center of the image as the direction of the object image away from the lens. For example, the length of the first depth of field motion vector V1 is the depth of field displacement, and the direction of the first depth of field motion vector V1 is the direction which the first object image 901 heading towards the horizon center C1 of the first image 902. That is, the direction of the first depth of field motion vector V1 is the direction of the object moves away from the first lens and the second lens, and the length of the first depth of field motion vector V1 corresponds to the distance shown on the image by which the object moves away from the first lens and the second lens.

Figure 11B:
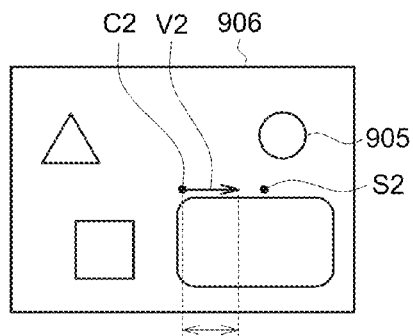

Refer to FIG. 11B. The control unit 204 uses one pixel of the second background image as a particular pixel S2, and the particular pixel S2 is used as the starting point. And the control unit 204 determines a second depth of field motion vector V2. The direction of the second depth of field motion vector V2 is the direction of the horizon center C2 of the second image 906 heading towards the starting point. There is a ratio relationship between the length of the second depth of field motion vector V2 and the first depth of field motion vector V1. The ratio relationship is a ratio of the distance between the starting point and the horizon center C2 of the second image 906 to the distance between the first object image 901 and the horizon center C1 of the first image 902. That is, when the distance between the starting point and the horizon center C2 of the second image 906 is d3 and the distance between the first object image 901 of the first image 902 and the horizon center C1 of the first image 902 is d4, then the length of the second depth of field motion vector V2 is equal to the length of the first depth of field motion vector V1 multiplied by (d3/d4), and can be expressed as: $|V1|*(d3/d4)$. In another embodiment, the second depth of field motion vector V2 can be determined in another way. The direction of the second depth of field motion vector V2 is the direction of the horizon center C2 of the second image 906 heading towards the starting point, and the length of the second depth of field motion vector V2 is the magnitude of relative depth of field displacement. The relative depth of field displacement represents the displacement of the background object with respect to the object 301 in the image. Furthermore, the relative depth of field displacement can be determined as follows. Firstly, the control unit 204 subtracts the first depth of field from the second depth of field to obtain a difference. When the first depth of field is 30 meters and the second depth of field is 40 meters, then the difference is 10 meters. The difference of 10 meters represents the distance by which the moving object moves away from the camera plane. Therefore, it can be assumed that the background object moves towards the camera plane by 10 meters with respect to the moving object. Then, the control unit 204 calculates the depth of field of the background object corresponding to the particular pixel S2 according to the view-angle difference between the first image 902 and the third image 904. Suppose the depth of field the background object corresponding to the particular pixel S2 is 20 meters, and can be defined as the starting depth of field. Then, according to the movement of the moving object, that is, 10 meters by which the moving object moves away from the camera plane, it can be estimated that the background object moves from starting depth of field (which is 20 meters) towards the position having a depth of field of 10 meters, that is, the ending depth of field. Then, as indicated in the look-up table of Table 1, the corresponding position in the image of the starting depth of field of 20 meters is X2, and the corresponding position in the image of the ending depth of field of 10 meters is X1. Then, the control unit 204 subtracts the corresponding position X1 from the corresponding position X2 to obtain a relative depth of field displacement. Additionally, in an embodiment, if the starting depth of field and the ending depth of field cannot be found in the look-up table, the control unit 204 can calculate the corresponding position in the image of the starting depth of field and the corresponding position in the image of the ending depth of field by interpolation or extrapolation.

Figure 12:
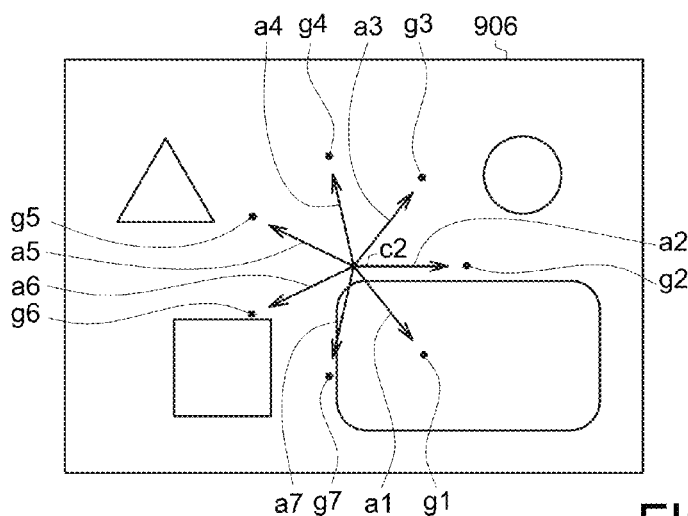
FIG. 12 is a diagram of different particular pixels respectively corresponding to different second motion vectors of depth of field.

In this step, different particular pixels respectively correspond to different second depth of field motion vectors. Referring to FIG. 12, a diagram of different particular pixels respectively corresponding to different second depth of field motion vectors is shown. As indicated in FIG. 12, different particular pixels g1~g7 respectively correspond to different second depth of field motion vectors a1~a7. As illustrated in the diagram, the second depth of field motion vectors corresponding to different pixels form a radiating pattern taking the horizon center C2 as the center.

Figure 11C:
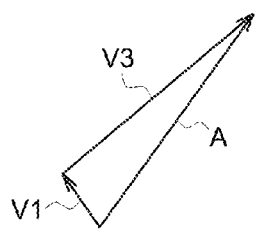

Then referring to FIG. 11C. The control unit 204 subtracts a first depth of field motion vector V1 from a sum motion vector A to obtain a plane motion vector V3. Furthermore, in step 106, the sum motion vector of the object A obtained by subtracting the first image 902 from the second image 906 or subtracting the third image 904 from the fourth image 908 is composed of two directional vectors. The two directional vectors respectively are the motion vector along which the object moves away from the lens and the motion vector along which the object moves in a plane parallel to the lens plane. Therefore, the purpose of subtracting the first depth of field motion vector V1 from the sum motion vector A is to obtain the motion vector along which the object moves in a plane parallel to the lens plane, that is, the plane motion vector V3.

Figure 11D:
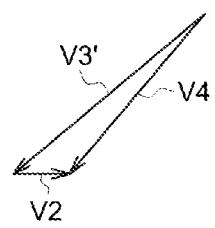

Referring to FIG. 11D. The control unit 204 adds the second depth of field motion vector of V2 to the inverse vector V3' of the plane motion vector V3 to obtain the sub-motion vector V4. Since different particular pixels respectively correspond to different second depth of field motion vectors, different particular pixels will also correspond to different sub-motion vectors.

Figure 14:
FIG. 14 is another example of a photo carrying sense of speed.

After the sub-motion vector V4 is obtained, the control unit 204 uses the particular pixel S2 as the starting point, obtains all pixels within the length of the sub-motion vector V4 in a direction starting from the starting point and along the direction of the sub-motion vector V4, and takes average of the colors of all obtained pixels and uses the averaged color as the color of the particular pixel S2. In the present exemplary embodiment, the method by which the control unit 204 obtains all pixels within the length of the sub-motion vector V4 in a direction starting from the starting point and along the direction of the sub-motion vector V4, and takes average of the colors of all obtained pixels and using the averaged color as the color of the particular pixel S2 is similar to that of the first exemplary embodiment, and the similarities are not repeated here. For different particular pixels, the colors of the particular pixels are averaged colors of a plurality of pixels according to different sub-motion vectors which have different directions and lengths. Referring to FIG. 14, another example of a photo carrying sense of speed is shown. The third image generated according to the above method generates a radiating pattern taking the object image as the center. When the moving object moves towards the horizon center, the background image is a radiating pattern moving towards the lens.

In the second exemplary embodiment, a depth of field displacement of an object can be calculated according to two lenses and a view-angle difference between images, and image processing is applied to the still object of the image according to the depth of field displacement. Accordingly, the obtained image includes the object moving away from the lens further carries sense of speed.

According to the image processing method disclosed in above embodiments of the present invention, the moving direction and displacement of an object can be obtained by shooting the same image shot within the same shooting range at the first time point and the second time point respectively. Then, in the image obtained at the second time point, the image corresponding to the moving object is kept, and blurring process is applied to the image corresponding to the still scenery in a direction reverse to the moving direction of the object. Thus, a photo in which the main body of the moving object is clear and carries sense of speed can be obtained. Therefore, according to the image processing method of the present invention, a person without expertise of photography still can take a photo in which the main body of the moving object has clear image and carries sense of speed, such that a diversity of camera functions can be provided to enhance market competitiveness of the electronic device.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, comprising:
    obtaining a first image at a first time point, wherein the first image comprises a first object image and a first background image, and the first object image corresponds to a position of an object at the first time point;
    obtaining a second image at a second time point, wherein the second image comprises a second object image and a second background image, the second object image corresponds to the position of the object at the second time point, the first image and the second image are shot within substantially the same shooting range, and the second image has a plurality of pixels;
    obtaining a sum motion vector of the object according to the first object image and the second object image; and
    keeping the second object image and applying a process to each pixel of the second background image in the second image to generate a third image, wherein one of the pixels of the second background image is a particular pixel;
    wherein the process applied to the particular pixel comprises: obtaining a plurality of related pixels from the plurality of pixels of the second image according to the particular pixel of the second background image and the sum motion vector, and determining the color of the particular pixel according to the obtained related pixels.

2. The image processing method according to claim 1, wherein the step of obtaining the plurality of related pixels from the plurality of pixels of the second image according to the particular pixel of the second background image and the sum motion vector, and determining the color of the particular pixel according to the obtained related pixels further comprises:
    using the particular pixel as a starting point;
    obtaining all pixels within the length of the sum motion vector in a direction starting from the starting point and along the reverse direction of the sum motion vector; and
    taking average of the colors of all obtained pixels and using the averaged color as the color of the particular pixel.

3. The image processing method according to claim 2, wherein in the step of obtaining all pixels within the length of the sum motion vector in the direction starting from the starting point and along the reverse direction of the sum motion vector comprises:
    if at least a portion of the pixels to be obtained within the length of the sum motion vector are located outside the edge of the second image, obtaining all pixels between the starting point and the edge of the second image in the direction starting from the starting point and along the reverse direction of the sum motion vector.

4. The image processing method according to claim 2, wherein in the step of obtaining all pixels within the length of the sum motion vector in the direction starting from the starting point and along the reverse direction of the sum motion vector comprises:
    if at least a portion of the pixels to be obtained within the length of the sum motion vector are located outside the edge of the second image, deleting the particular pixel.

5. The image processing method according to claim 1, wherein the step of obtaining the sum motion vector of the object according to the first object image and the second object image comprises:
    subtracting the grayscale value of each pixel of the first image from the grayscale value of corresponding pixel in the second image to obtain a first position of the first object image in the first image and a second position of the second object image in the second image; and
    obtaining the sum motion vector according to the distance and direction of the first position and the second position.

6. The image processing method according to claim 1, wherein in the step of obtaining the first image and the step of obtaining the second image, the first image is obtained by a lens shooting at the first time point and the second image is obtained by the lens shooting at the second time point.

7. The image processing method according to claim 1, wherein the first image and the second image are obtained by a stereo camera lens, the stereo camera lens has a first lens and a second lens, and the step of obtaining the first image and the step of obtaining the second image comprise:
    obtaining the first image by the first lens and obtaining a third image by the second lens at the first time point, wherein the third image corresponds to the position of the object at the first time point; and
    obtaining the second image by the first lens and obtaining a fourth image by the second lens at the second time point, wherein the fourth image corresponds to the position of the object at the second time point, and the third image and the fourth image are shot within substantially the same shooting range.

8. The image processing method according to claim 7, wherein before the step of keeping the second object image and applying the process to each pixel of the second background image in the second image to generate the third image, the method further comprises:
    calculating a first depth of field of the object at the first time point according to a view-angle difference between the first image and the third image;
    calculating a second depth of field of the object at the second time point according to a view-angle difference between the second image and the fourth image; and
    obtaining a depth of field displacement according to the first depth of field and the second depth of field;
    wherein the process comprises obtaining the related pixels from the pixels of the second image according to the particular pixel of the second background image, the sum motion vector and the depth of field displacement, and determining the color of the particular pixel according to the obtained related pixels.

9. The image processing method according to claim 8, wherein the step of obtaining the related pixels from the pixels of the second image according to the particular pixel of the second background image, the sum motion vector and the depth of field displacement, and determining the color of the particular pixel according to the obtained related pixels further comprises:
  determining a first depth of field motion vector according to the depth of field displacement and a direction in which the first object image of the first image towards the horizon center of the first image;
  using the particular pixel as the starting point;
  determining a second depth of field motion vector, wherein the direction of the second depth of field motion vector is the direction in which the horizon center of the second image towards the starting point, the length of the second depth of field motion vector is associated with the distance between the starting point and the horizon center of the second image and the distance between the first object image of the first image and the horizon center of the first image;
  subtracting the first depth of field motion vector from the sum motion vector to obtain a plane motion vector;
  adding an inverse vector of the plane motion vector to the second depth of field motion vector to obtain a sub-motion vector;
  obtaining all pixels within the length of the sub-motion vector in a direction starting from the starting point and along the direction of sub-motion vector; and
  taking average of all obtained pixels and using the averaged color as the color of the particular pixel.

10. The image processing method according to claim 9, wherein the length of the second depth of field motion vector is a ratio of the distance between the starting point and the horizon center of the second image to the distance between the first object image of the first image and the horizon center of the first image.

11. An electronic device, comprising:
  an image capture circuit; and
  a control circuit coupled to the image capture circuit for controlling the image capture circuit to obtain a first image at a first time point and obtain a second image at a second time point, wherein the first image comprises a first object image and a first background image, the first object image corresponds to a position of an object at the first time point, the second image comprises a second object image and a second background image, the second object image corresponds to the position of the object at the second time point, the first image and the second image are shot within substantially the same shooting range, and the second image has a plurality of pixels;
  wherein the control circuit obtains a sum motion vector of the object according to the first object image and the second object image, keeps the second object image and applies a process to each pixel of the second background image in the second image to generate a third image, and uses one of the pixels of the second background image as a particular pixel;
  wherein the process applied to the particular pixel comprises: obtaining a plurality of related pixels from the plurality of pixels of the second image according to the particular pixel of the second background image and the sum motion vector, and determining the color of the particular pixel according to the obtained related pixels.

12. The electronic device according to claim 11, wherein when the control circuit obtains the plurality of related pixels from the plurality of pixels of the second image according to the particular pixel of the second background image and the sum motion vector and determines the color of the particular pixel according to the obtained related pixels, the control circuit further uses the particular pixel as a starting point, obtains all pixels within the length of the sum motion vector in a direction starting from the starting point and along the reverse direction of the sum motion vector, and takes average of the colors of all obtained pixels and uses the averaged color as the color of the particular pixel.

13. The electronic device according to claim 12, wherein when the control circuit obtains all pixels within the length of the sum motion vector in the direction starting from the starting point and along the reverse direction of the sum motion vector, the control circuit obtains all pixels between the starting point and the edge of the second image in the direction starting from the starting point and along the reverse direction of the sum motion vector if at least a portion of the pixels to be obtained within the length of the sum motion vector are located outside the edge of the second image.

14. The electronic device according to claim 12, wherein when the control circuit obtains all pixels within the length of the sum motion vector in the direction starting from the starting point and along the reverse direction of the sum motion vector, the control circuit deletes the particular pixel if at least a portion of the pixels to be obtained within the length of the sum motion vector are located outside the edge of the second image.

15. The electronic device according to claim 11, wherein when the control circuit obtains the sum motion vector of the object according to the first object image and the second object image, the control circuit further subtracts the grayscale value of each pixel of the first image from the grayscale value of corresponding pixel in the second image to obtain a first position of the first object image in the first image and a second position of the second object image in the second image, and obtains the sum motion vector according to the distance and direction of the first position and the second position.

16. The electronic device according to claim 11, wherein the image capture circuit has a lens, and when the control circuit controls the image capture circuit to obtain the first image and the second image, the control circuit further controls the lens to shoot at the first time point to obtain the first image, and controls the lens to shoot at the second time point to obtain the second image.

17. The electronic device according to claim 11, wherein the image capture circuit is a stereo camera lens having a first lens and a second lens, when the control circuit controls the image capture circuit to obtain the first image and the second image, the control circuit controls the first lens and the second lens to shoot the first image and a third image respectively at the first time point, and further controls the first lens and the second lens to shoot the second image and a fourth image respectively at the second time point;
  wherein the third object image corresponds to the position of the object at the first time point, the fourth object image corresponds to the position of the object at the second time point, and the third image and the fourth image are shot within substantially the same shooting range.

18. The electronic device according to claim 17, wherein before the control circuit keeps the second object image and applies the process to each pixel of the second background image in the second image to generate the third image, the control circuit further calculates a first depth of field of the object at the first time point according to the view-angle difference between the first image and the third image, calculates a second depth of field of the object at the second time point according to the view-angle difference between the second image and the fourth image, and calculates a depth of field displacement according to the first depth of field and the second depth of field;

wherein in the process, the control circuit further obtains the related pixels from the pixels of the second image according to the particular pixel of the second background image, the sum motion vector and the depth of field displacement, and determines the color of the particular pixel according to the obtained related pixels.

19. The electronic device according to claim 18, wherein when the control circuit obtains the related pixels from the pixels of the second image according to the particular pixel of the second background image, the sum motion vector and the depth of field displacement and determines the color of the particular pixel according to the obtained related pixels, the control circuit further determines a first depth of field motion vector according to the depth of field displacement and a direction in which the first object image of the first image towards the horizon center of the first image, uses the particular pixel as the starting point and determines a second depth of field motion vector, the direction of the second depth of field motion vector is the direction in which the horizon center of the second image towards the starting point, the length of the second depth of field motion vector is associated with the distance between the starting point and the horizon center of the second image and the distance between the first object image of the first image and the horizon center of the first image, the control circuit further subtracts the first depth of field motion vector from the sum motion vector to obtain a plane motion vector, adds an inverse vector of the plane motion vector to the second depth of field motion vector to obtain a sub-motion vector, obtains all pixels within the length of the sub-motion vector in a direction starting from the starting point and along the direction of the sub-motion vector, and takes average of all obtained pixels and uses the averaged color as the color of the particular pixel.

20. The electronic device according to claim 19, wherein the length of the second depth of field motion vector is a ratio of the distance between the starting point and the horizon center of the second image to the distance between the first object image of the first image and the horizon center of the first image.

* * * * *